(12) United States Patent
Hurst et al.

(10) Patent No.: US 7,208,082 B2
(45) Date of Patent: Apr. 24, 2007

(54) DRAINAGE WATER FILTER FOR EROSION CONTROL

(75) Inventors: John G. Hurst, 1822 Orchard Wood Rd., Encinitas, CA (US) 92024; David C. Runner, Vista, CA (US); Samuel L. Hensley, Wildomar, CA (US)

(73) Assignee: John G. Hurst, Encinitas, CA (US)

( * ) Notice: Subject to any disclaimer, the term of this patent is extended or adjusted under 35 U.S.C. 154(b) by 249 days.

(21) Appl. No.: 10/980,941

(22) Filed: Nov. 3, 2004

(65) Prior Publication Data
US 2006/0091049 A1 May 4, 2006

(51) Int. Cl.
*C02F 1/00* (2006.01)
*C02F 1/28* (2006.01)

(52) U.S. Cl. .................. 210/164; 210/502.1; 210/691; 405/40; 405/127; 404/4

(58) Field of Classification Search ................ 210/163, 210/164
See application file for complete search history.

(56) References Cited

U.S. PATENT DOCUMENTS

| 459,259 | A | | 9/1891 | Shunk et al. | |
|---|---|---|---|---|---|
| 1,861,031 | A | | 5/1932 | Schmitt | |
| 1,999,637 | A | | 4/1935 | Pettepher | |
| 4,418,432 | A | | 12/1983 | Vidal | |
| 4,594,157 | A | | 6/1986 | McGowan | |
| 4,671,976 | A | | 6/1987 | Vidal | |
| 5,003,642 | A | * | 4/1991 | Robb et al. | 4/287 |
| 5,007,766 | A | | 4/1991 | Freed et al. | |
| 5,034,122 | A | | 7/1991 | Wiesemann | |
| 5,223,154 | A | * | 6/1993 | MacPherson et al. | 210/790 |
| D341,413 | S | * | 11/1993 | Nichols | D23/261 |
| 5,264,134 | A | * | 11/1993 | McCamy | 210/679 |
| 5,304,311 | A | | 4/1994 | Codiglia | |
| 5,345,741 | A | * | 9/1994 | Slater et al. | 52/646 |
| 5,403,474 | A | * | 4/1995 | Emery | 210/163 |
| 5,534,140 | A | | 7/1996 | Brummond et al. | |
| 5,702,595 | A | * | 12/1997 | Mossburg, Jr. | 210/163 |
| 5,788,849 | A | | 8/1998 | Hutter, Jr. et al. | |

(Continued)

OTHER PUBLICATIONS

Filtr-Fence, Product Information, ACF Environmental website, www.acfenvironmental.com, May 2004, (1 page).

(Continued)

*Primary Examiner*—Robert James Popovics
(74) *Attorney, Agent, or Firm*—James D. McFarland

(57) ABSTRACT

A storm drain filter including a frame holding a filter assembly to filter incoming drainage water and thereby prevent sediment from entering the storm drain's inlet. The frame can be easily removed and replaced to allow street sweeping. In one embodiment, an erosion control apparatus comprises one or more broom filters each including a plurality of adjacent bristles, and a frame that holds the broom filter(s) so that the bristles extend downwardly to the road surface. In one embodiment, the beam of the broom filter is pivotally connected to the frame, and the bristles have substantially greater than a 90° vertical angle, to allow the weight and flexibility of the bristles to conform to variations in the road surface. A filtration bag to filter hydrocarbons may be attached downstream of the broom filter. The frame can be designed for a wide variety of implementations, and can be re-usable.

29 Claims, 10 Drawing Sheets

U.S. PATENT DOCUMENTS

| | | | |
|---|---|---|---|
| 5,843,306 A * | 12/1998 | Singleton | 210/163 |
| 5,851,087 A | 12/1998 | Berry, III | |
| 5,855,774 A | 1/1999 | Boelter | |
| 5,989,417 A * | 11/1999 | Fleischhacker | 210/163 |
| 6,004,457 A * | 12/1999 | Singleton | 210/163 |
| 6,015,489 A | 1/2000 | Allen et al. | |
| 6,017,166 A * | 1/2000 | Mossburg, Jr. | 404/5 |
| 6,053,665 A * | 4/2000 | Richardson | 405/302.6 |
| 6,059,964 A * | 5/2000 | Strawser, Sr. | 210/164 |
| 6,402,942 B2 | 6/2002 | Cardwell et al. | |
| 6,422,787 B1 * | 7/2002 | Mikell | 405/15 |
| 6,679,994 B1 | 1/2004 | Turco et al. | |
| 6,922,953 B1 * | 8/2005 | Lewis | 52/126.1 |
| 2003/0173277 A1 * | 9/2003 | Shaw et al. | 210/163 |
| 2004/0069697 A1 | 4/2004 | Martinez | |
| 2004/0134843 A1 | 7/2004 | Kolb | |
| 2005/0051467 A1 * | 3/2005 | Yehuda | 210/156 |

OTHER PUBLICATIONS

Trash Racks Water Screening Devices Product Information, ACF Environmental website, www.acfenvironmental.com, May 2004, (1 page).

Gutterbuddy Curb Gutter Storm Drains Product Information, ACF Environmental website, www.acfenvironmental.com, May 2004, 2 pages.

Hydro-Kleen Storm Water Filtration System, Product Information, ACF Environmental website, www.acfenvironmental.com, May 2004, 2 pages.

Kristar Product Information including Work-Gard, Flo-Gard, Flo-Gard+plus, Kristar website, www.kristar. May 3, 2004, 9 pages.

Dandy Products Information: Beaver Dam (2 pgs), Dandy Bag (2 pgs), TrueDam (2 pgs), www.dandyproducts.com, circa 2004.

Advertisements: North American Green (1 pgs), The BMP Store (1 pgs), Dandy Products (1 pgs), *Erosion Control*, vol. 11, No. 3, May/Jun. 2004, pp. 2, 4, 5.

SeaSafe Strut Systems Product Information, 1 page, circa Sep. 2004.

* cited by examiner

DRAINAGE WATER FILTER FOR EROSION CONTROL

BACKGROUND OF THE INVENTION

1. Field of the Invention

This invention relates to erosion control devices such as those used at a construction site to block dirt and other contaminants from entering the water drainage system.

2. Description of Related Art

At construction sites, dams such as rock bags (semi-porous bags filled with rocks) are typically used to filter the flow of water into storm drains, in order to protect the water quality of the bodies of water into which the storm drain flows, and also to prevent unwanted buildup of these contaminants within the drainage system, which could otherwise clog the drainage system.

For example, a number of rock bags may be positioned around a storm drain in order to filter drainage water from the construction site, and prevent other construction contaminants from entering the storm drain, thereby reducing water pollution and protecting water quality.

In addition to the rock bags, other portable dams and erosion control systems have been developed. For example, straw waddles, which include a long tubular-shaped sheath of straw have been used to slow and filter drainage water. Commercial products such as the Gutterbuddy™, available from ACF Environmental of Richmond, Va. (www.acfenvironmental.com) include synthetic fibers bundled in a tube. In addition, inlet protection systems such as the FiltR Fence™, also available from ACF Environmental, include a frame that has a screen-like geotextile sleeve that is attached around the frame's perimeter. In that design, the frame can be assembled by securing the frame members to each other with steel pins. The assembled frame is then placed to protect an inlet. The FiltR Fence™ frame can also be taken apart for ease of transportation.

These erosion control systems all have drawbacks. For example, rock bags are heavy, expensive to implement, and/or in practice do not function well to prevent pollution. For example, dirt quickly builds up within the rock bags and the other dams, rendering them effectively useless. Dirt and rocks also build up in front of the bags, eventually blocking the flow of water, all of which can create large puddles of backed-up water. While the proper practice would then be to shovel out the dirt and the backed-up water and replace the non-functional bags, in practice construction workers find it easier to just pick up one or two bags and let the water flow through the open space. Furthermore, in a big rainstorm, the flow of water may be so large and forceful as to simply flow right over the bags.

Optimally, the dirt and rocks that build up in front of the bags should be cleaned regularly in order to ensure proper function. However, the rock bags create a difficult obstacle for street sweeping, and rather than moving the heavy bags and re-positioning them, the street sweeper usually just drives around the bags, leaving the dirt and rock buildup in front of the bags.

In addition, the bags are often damaged when run over by heavy equipment at a construction site, and even if they are not damaged, eventually they deteriorate due to effects of weather (e.g., sun and water), all of which limits their effectiveness. Severely damaged or deteriorated bags can spill rock, which actually adds to the problem of construction debris rather than reducing it. And at the end of the construction project, removal and disposal of the rocks and rock bags can require considerable time and expense.

Furthermore, the rock bags at best only filter dirt, sand and large objects such as rocks and gravel. Other contaminants such as oil or smaller particles are not filtered by the rock bags, leaving those contaminants to pollute water supplies and clog drainage systems. Specifically, it would be advantageous to effectively filter particulate matter down to 10 microns, which would include hydrocarbon excess such as may build up on roads from gas and oil spillage, tire wear, and other motor vehicle usage, and prevent such waste from getting into the water system.

In addition to their uses for storm drain inlet protection in a construction site, water dams may be placed extending from the gutters into the road in an effort to slow the flow of dirt- and rock-laden water into the storm drains. A series of these dams are situated at intervals along the road, extending into the road. However these water-slowing dams have the same deterioration, blockage, and cleaning problems as the dams used for blocking and filtering run-off water that drains into a storm drain.

SUMMARY OF THE INVENTION

A storm drain filter is described herein that includes a frame that holds a filter assembly in a configuration to filter incoming drainage water and thereby protect the storm drain's inlet. The frame can be easily removed and replaced to allow street sweeping. Furthermore, the frame is reusable, and therefore at the end of the construction project the frame is simply removed for use at another site, and therefore there is no disposal problem as there otherwise would be with rock bags.

In one described embodiment, an erosion control apparatus for filtering drainage water flowing along a surface comprises a broom filter including a plurality of adjacent bristles attached at their proximate ends along the length of a beam, and a frame that holds the broom filter so that the bristles extend downwardly from the beam toward the surface, and the distal ends of the bristles substantially contact the surface. Typically, the bristles form at least a 90° vertical angle with respect to the flow direction of the drainage water, and the bristles may have substantially greater than a 90° vertical angle with respect to the flow direction of the drainage water, thereby allowing the weight and flexibility of the bristles to conform to variations in the road surface, and so that the flowing water forces the bristles against the road surface, thereby providing resistance to forces resulting from the flowing water. Advantageously, the beam of the broom filter may be pivotally connected to the frame, so that the broom filter pivots about a long axis defined by the beam, thereby allowing the bristles to rotate to contact the surface, and thereby allowing the weight and flexibility of the bristles resting upon the surface to conform to any surface variations that may be present, and providing resistance to forces resulting from the flowing water.

Embodiments are described in which a filtration bag to filter hydrocarbons is attached to the broom filter, to filter drainage water downstream of the broom filter For example, the oil filtration bag may comprise a plurality of loops, and the beam may comprise a plurality of hooks arranged to receive and hold the plurality of loops.

In addition at least one secondary broom filter can be positioned downstream of the first broom filter, for example to provide a greater filtering capability, and/or to provide a backup filter.

The frame can be designed to fit a wide variety of implementations. For example a curbside frame may have a configuration that surrounds a storm drain inlet, and further comprises a plurality of broom filters positioned around the periphery of the frame.

In other embodiments, the broom filter may be attached to an arm that extends from a curb of the road in an extended position. For example, the arm may be pivotally attached to the ground proximate to the curb, thereby allowing the arm to be temporarily removed from its operational extended position along the road surface.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described herein with reference to the Figures, in which like numbers represent the same or similar elements.

Overview

A filtering system is disclosed herein that utilizes a filter assembly that includes a broom (sediment) filter for filtering out dirt, sand, rock, and an optional filtration bag for filtering other contaminants (such as oil) in drainage water run-off, and preventing it from entering into a water drainage system.

The filtering system is described herein in the context of construction sites that have a large amount of broken ground and a correspondingly large amount of dirt- and rock-laden run-off; however, it could also be used in other locations, for other drainage systems, and in a variety of implementations. In one implementation described herein, termed a "storm drain filter," a filter assembly is affixed to a frame structure that is designed to hold the filter assembly against a road. The frame has a configuration to surround the storm drain and position the filter assemblies to protect the storm drain against contamination. In another described implementation termed a "street filter," the filter(s) are connected to an arm that extends into the road from the side, in order to filter drainage water as it flows along the road.

One filter assembly described herein comprises two separate filter components (a broom filter and a filtration bag) connected together. It should be apparent that either of the filter components can be used separately or together as appropriate for a particular use. This particular filter assembly is used to illustrate operation of the filtering system described herein.

In one embodiment, the broom filter is rotatable, which advantageously allows it to automatically conform to road surface elevation and irregularities.

Storm Drain Background Information

A storm drain includes an inlet positioned to receive drainage water, which is then directed using a drainage system that typically includes a network of pipes and conduits to a disposal area. Via this drainage system, typically the run-off water eventually flows into another body of water, such as a river, lake, or ocean. In land-locked locations, the run-off water may be directed to a low-lying area from which it can drain into the ground water, or evaporate.

Storm drains may have a number of forms; such as a curbside storm drain that has an inlet positioned to receive water as it flows along a curb, or a "stand-alone" storm drain (wash-out) that has an inlet anywhere on a surface where water would normally collect, such as a low point in a road or intersection. Usually storm drains are discussed in the context of a paved surface; however, storm drains may also be implemented on non-paved surfaces, such as rock, gravel, or dirt.

Figure 1:
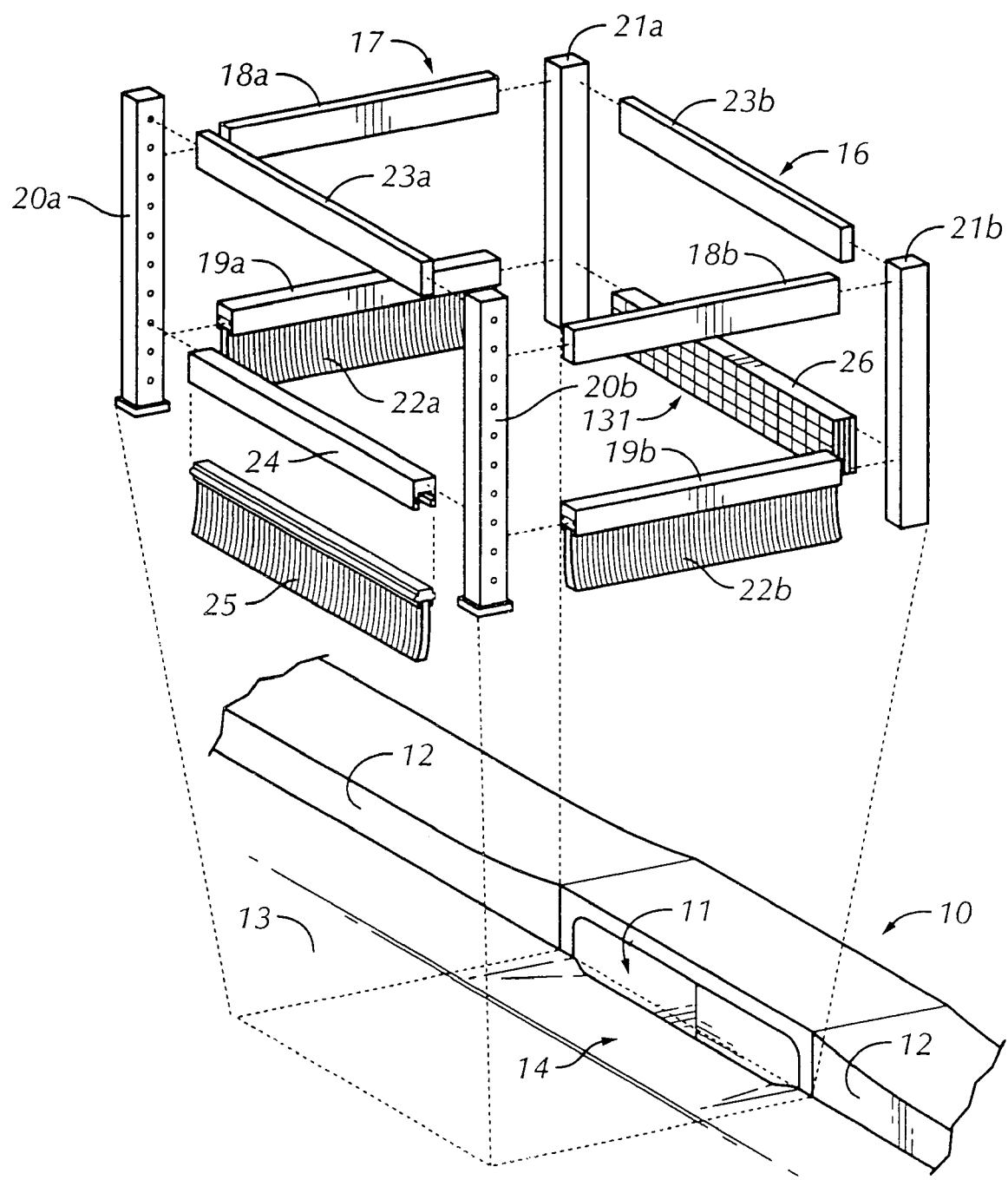
FIG. 1 is a perspective view of a curbside storm drain and an erosion control filter shown floating above, illustrating the position in which the filter will be positioned on the storm drain.

FIG. 1 shows a curbside storm drain 10 that includes an inlet 11, formed as an opening in a curb 12, and a road 13 that has a downward sloping section 14 that leads water to the inlet 11. The inlet directs drainage water, via a system of pipes and conduits (not shown), to a drainage water disposal area.

Description of Curbside Storm Drain

Figure 2:
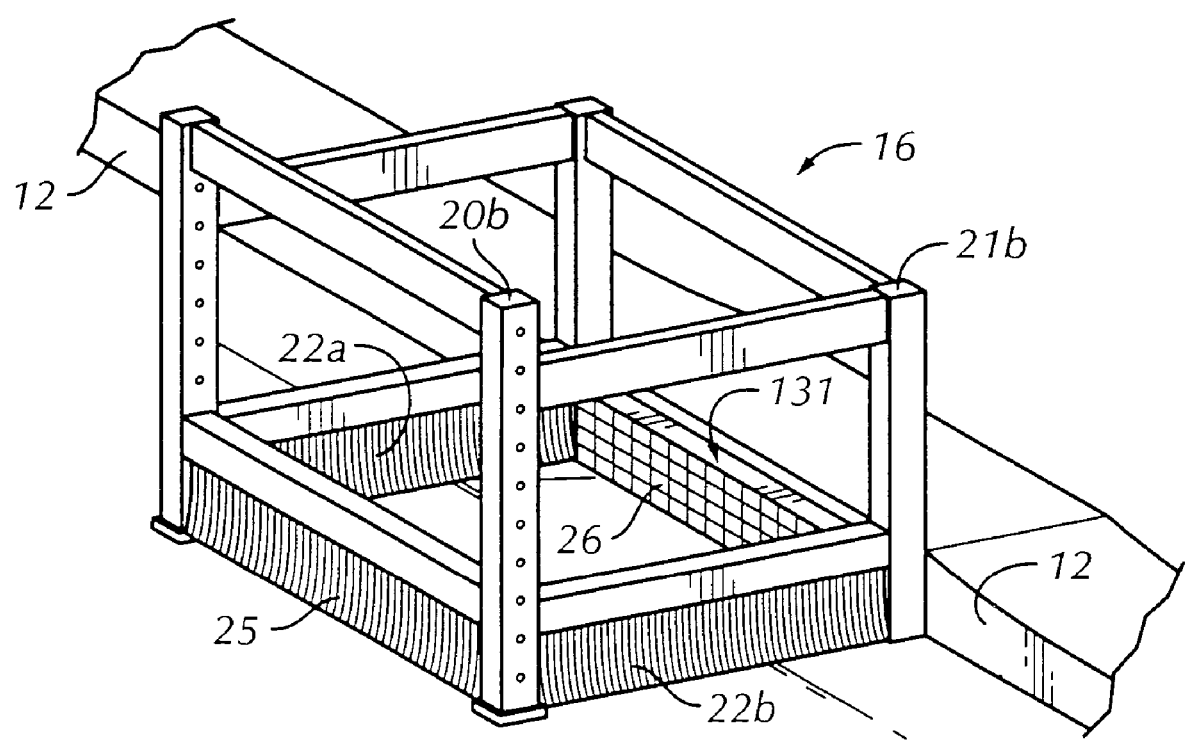
FIG. 2 is a perspective view of the erosion control filter positioned on the storm drain.

FIGS. 1 and 2 show perspective views of a curbside drainage water filter 16 for erosion control. In FIG. 1, the drainage water filter 16 is illustrated in exploded view above the storm drain. Dashed lines drawn from the filter 16 show its positioning with respect to the curbside storm drain, and in FIG. 2 the filter 16 has been placed in operational position on the storm drain.

The drainage water filter 16 includes a box-like frame 17 having a plurality of structural components interconnected by suitable connectors. For example, the frame may be constructed of readily available metal struts and connectors to fit the size requirements of the storm drain, or it may be constructed of non-metallic struts and connectors such as those manufactured by Seasafe, Inc. of Lafayette, La. (www.seasafe.com). The frame has a construction to surround the storm drain, and thereby to filter the drainage water flowing from the road into the inlet of the storm drain.

Figure 3:
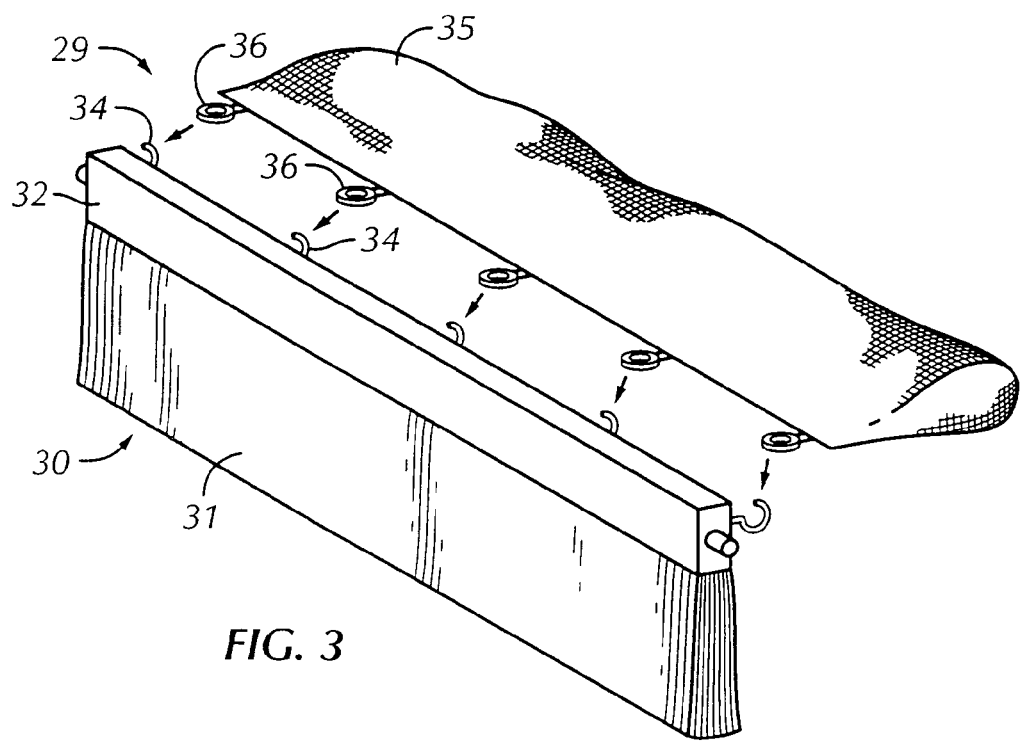
FIG. 3 is a perspective view of filter components including a broom filter and a filtration bag that provide a filter assembly.
Figure 12A:
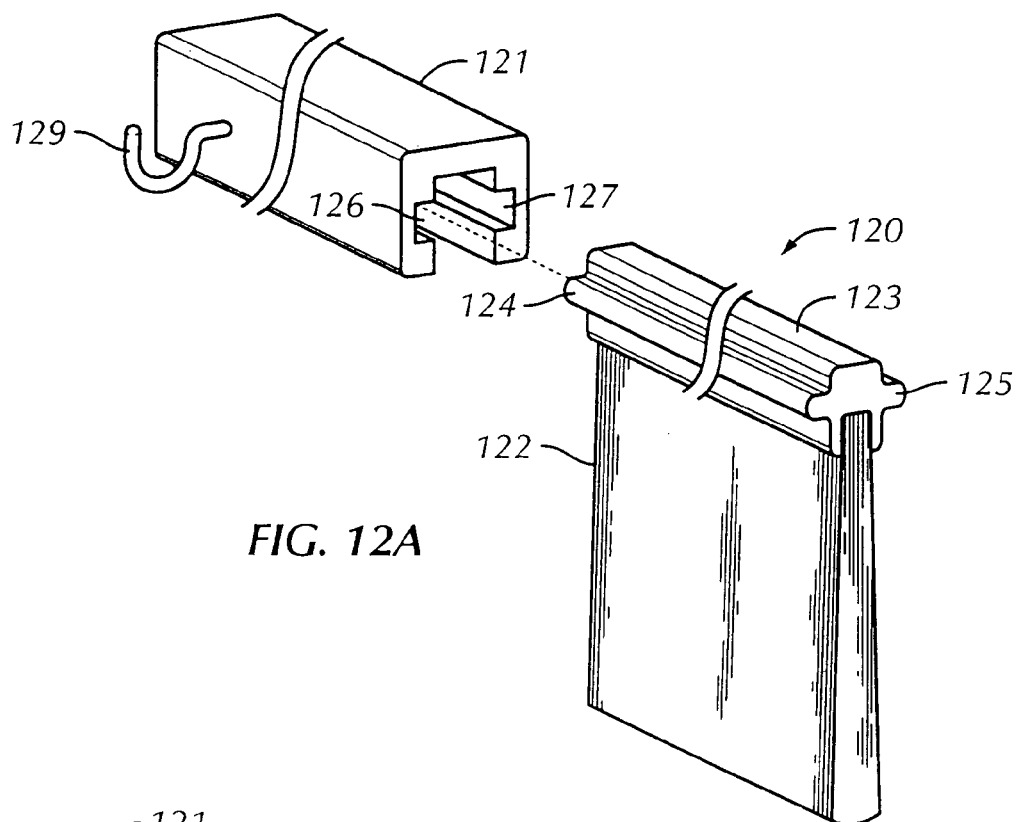
FIG. 12A is perspective view of one embodiment of a broom filter and a rail that holds the broom filter.
Figure 12B:
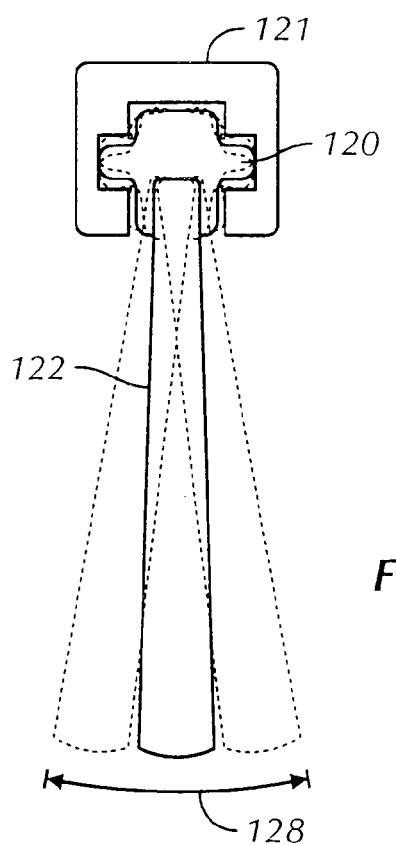
FIG. 12B is a cross-sectional view of the broom filter and rail as in FIG. 12A, illustrating positioning of the beam within the rail, and also illustrating clearances within the rail that provide movement of the bristles to allow better positioning on the road surface.

FIG. 1 is an exploded view of one embodiment of the frame 17. In this embodiment, a plurality of cross-members are connected by four posts to define an approximately box-like configuration. Particularly, a first side beam 18a and a first side rail 19a are connected between a first outside post 20a and a first inside post 21a. Likewise, a second side beam 18b and a second side rail 19b are connected between a second outside post 20b and a second inside post 21b. A first broom filter 22a, which is connected to (or forms part of) the first side rail 19a, extends downwardly to contact the road. A second broom filter 22b, which is connected to (or forms part of) the second side rail 19b, extends downwardly to contact the road. The broom filters are described in more detail with reference to FIGS. 3–5. The rails have a configuration suitable for the particular design; for example, if the broom filter has a construction such as shown in FIG. 3 with a cylindrical-shaped extension 45 and 46 on each end that allows for pivotal connection to the frame structure, then the rails may function to hold the posts a fixed distance apart, in order to securely hold the filter. Alternatively, if the broom filter has a construction such as shown in FIGS. 1, 12A and 12B, then the rails have an inner portion formed to accept the beam of the particular broom filter. Advantageously, the rail and the broom can be designed and implemented to save cost, and even to use off-the-shelf components.

Because the sloping road section 14 adjacent to the storm drain has a significant downward slope to promote water drainage, the inside and outside posts may have an unequal length to allow the upper cross-members of the frame to sit approximately level to the road. For example, the two inside posts 21a and 21b may be about three inches longer than the two outside posts 20a and 20b, because they are farthest from the curb. Also, the bottoms of the inside posts, where they meet the road may be angled to approximately conform to the road's angle adjacent to the curb.

The upper portions of the two outside posts 20a and 20b are connected by a rigid cross-beam 23a across their upper portions; likewise, the upper portions of the two inside posts 21a and 21b are connected by a rigid cross-beam 23b across their upper portions. The lower portions of the two outside posts 20a and 20b are connected by a rigid cross-rail 24, which is connected to (or may form part of) a broom filter 25 that extends downwardly from the cross-rail to contact the road. The lower portions of the two inside posts 21a and 21b connect to a housing 26 of a secondary filter assembly 131, which is described in more detail with reference to FIG. 13.

In one embodiment, the side beams and the side rails are pre-affixed to the respective inside and outside posts to provide a pre-assembled side section. For example, the first side beam 18a and the first side rail 19a are affixed between the first outside post 20a and the first inside post 21a to define a side section having predetermined dimensions of, for example about two feet from the curb, which is chosen to provide adequate filtering area. Advantageously, because the dimensions of the side sections can be standardized and the side sections are pre-assembled, assembly of the entire frame in the field is facilitated.

The cross-beams 23a and 23b, the cross-rail 24, and the secondary filter housing 26 have a length sufficient to cover the inlet opening in the storm drain. Because of the length of the inlet opening varies from storm drain to storm drain (generally determined by engineers to meet water flow requirements), the cross-beams, the rails and the secondary filter cannot have a single standard size, but instead are provided in a variety of lengths in order to accommodate the various storm drains. If desired, they can also be cut to the desired length. In summary, to cover a particular storm drain, two standard-size end sections are joined by cross-beams, a cross-rail, and a filter housing that have a length appropriate to at least cover the inlet opening. In other words, since storm drain inlets have varying lengths, the cross-members may be provided in a number of different lengths, and during installation, the appropriate length of the cross-members is selected to accommodate the length of the particular inlets. Thus, the frame can be assembled easily, broken down easily, transported efficiently, and stored in a small area, all of which can be advantageous.

In FIGS. 1 and 2, the frame 17 has a particular design to surround the storm drain; however in alternative embodiments, the frame may have an alternative construction. For example, the frame may have a modular construction that includes four panels connected at their edges. In one such alternative embodiment, the panels may be hinged or removably connected so that they can be broken down easily, transported efficiently, stored in a small area, and assembled easily. In another embodiment, the frame may be designed with hinges to be foldable. The frame 17, at its lower end, has a suitable configuration to hold the particular filter assemblies chosen for a particular use.

Filter Assembly: Broom Filter and Filtration Bag Description

The filter assemblies, such as those shown in FIG. 1 at 19a, 19b, 25, and 26 may be provided in any of a number of different embodiments, some of which are discussed with reference to FIGS. 3–5, FIGS. 12A–B, and FIG. 13, although other embodiments are possible. Typically, the filter assembly includes at least filter components including a broom filter that has bristles positioned against the road for gross filtering of large particles in water run-off, such as dirt, sand and rocks, in order to separate them from the drainage water and prevent them from flowing into the storm drain inlet.

FIG. 3 is a perspective view of one filter assembly 29 that comprises filter components including a broom filter 30 and a filtration bag 35. In this embodiment, the broom filter 30 includes a plurality of bristles 31, a beam 32 that holds the bristles at their upper ends, and a plurality of hooks 34 positioned along the beam. Specifically, the broom filter 30 includes a plurality of stiff but flexible bristles 31 bundled together at their upper ends, and held by the beam 32. The beam 32 that holds the upper ends of the bristles together may be rigid, or it may have some flexibility as appropriate for the desired use.

The filtration bag 35 has a plurality of loops 36 provided on its upper end to allow detachable connection with the corresponding hooks 34 on the beam. As discussed above, the filter assembly 29 is affixed to the framed structure, which is positioned to filter drainage water. FIGS. 1 and 2, and FIGS. 9–12B show a variety of structures that hold the filter assembly; it should be apparent that other embodiments can be implemented.

Figure 4:
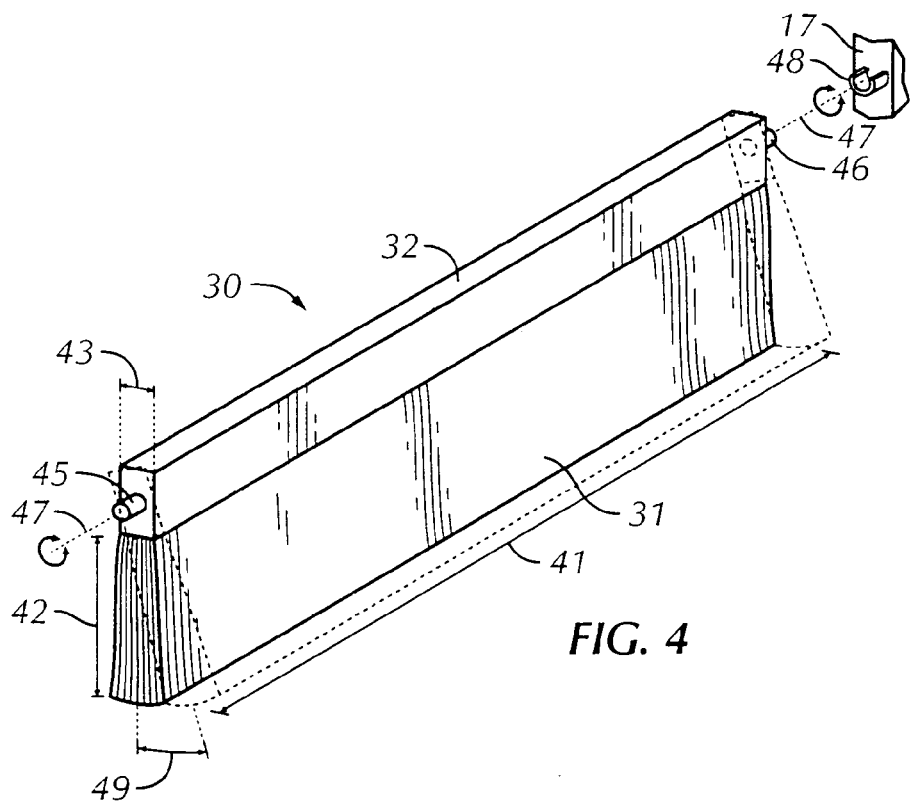
FIG. 4 is a perspective view of the broom filter, showing dimensions and an exploded view for the purpose of describing the broom filter.
Figure 5:
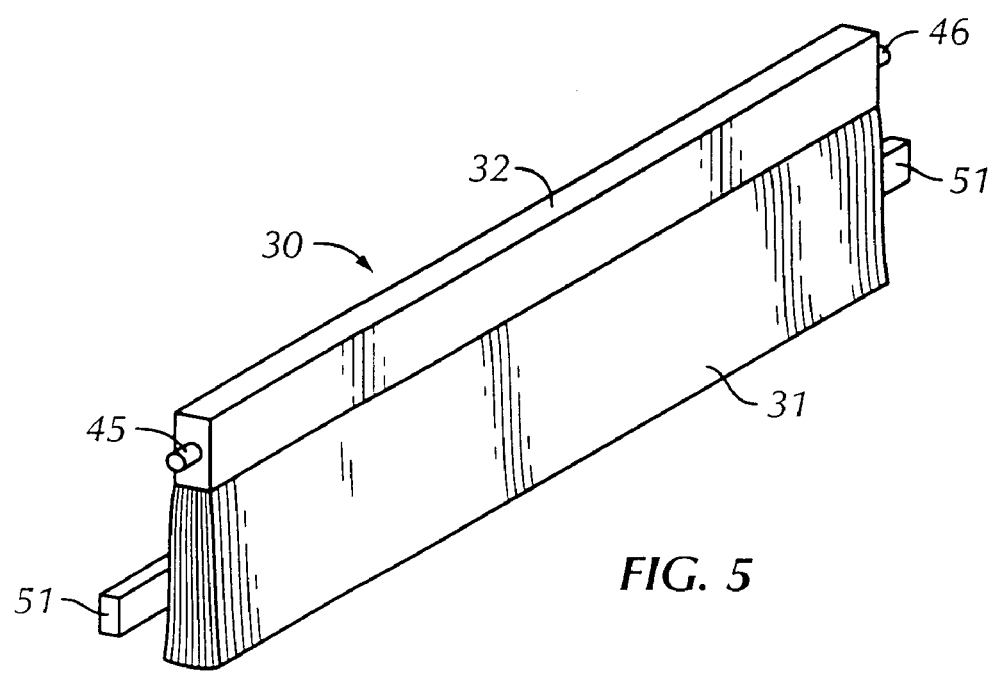
FIG. 5 is a perspective view of the filtration bag viewed from the side, showing the contaminant-absorbing filter media.

FIGS. 4 and 5 are perspective views of the broom filter 30 in different configurations. In FIGS. 4 and 5, the broom filter is arranged to rotate on an axis 47, and in FIG. 5 the frame also includes a support beam 51 situated behind the bristles to assist in supporting the bristles against the force of the flowing water. In addition, FIG. 4 shows dimensions and an exploded view for the purpose of describing the broom filter.

Referring to FIG. 4, the bristles have a length 41 along the long axis, a height 42 from the ground to the beam, and a depth shown at 43. The bristle's length 41 is determined by the particular design and intended application. The bristle's height 42 is determined by design considerations such as the flexibility and strength of the bristles, and the particular material used. The depth is also determined by design considerations; particularly the bristles may be arranged with an appropriate depth from the front edge sufficient to withstand the force of flowing water; for example, if the bristles are formed of a relatively stiff material (e.g., polypropylene), and have a diameter of 0.1", a depth of four or five bristles from the front edge to the back edge may be sufficient.

Still referring to FIG. 4, in the embodiment shown the beam 34 of the broom filter includes a cylindrical-shaped extension 45 and 46 on each end that allows for pivotal connection to the frame structure. The extensions define an axis 47 that defines an axis of rotation of the broom filter. The frame has an appropriate receptacle, such as a U-shaped bracket 48 that has a configuration to receive the cylindrical extensions 41 and 42. In such an embodiment, the extensions rest slideably on the U-shaped brackets 48 and hold the beam so that the broom filter can pivot about the long axis 47 defined by the extensions 45 and 46 on the rigid beam, thereby allowing the bristles to rotate to contact the road surface, and allowing it to conform to the elevation and variations in the road surface. Pivoting around the long axis 47 allows the bristles to be rotated forward, against the water flow, by a rotation angle 49.

In an embodiment shown in FIG. 5, a support beam 51 arranged behind the bristles to assist in supporting the bristles against the force of the flowing water. This support beam 51 may be connected to, and extend between any two posts, and may be part of the frame structure 17. For example, a support beam may extend between the inside (curbside) post 21*b* and the outside post 20*b*, to support a side broom filter 22*b*.

The bristles 31 have a length, diameter, stiffness, and material chosen to provide the desired filtering action and sufficient structural strength to withstand the force of flowing drainage water. For example, the bristles may have a length of 12.0 inches, a diameter of 0.1 inch, and are comprised of polypropylene.

One particularly advantageous material for the bristles 31 is polypropylene, which has been observed to "wick" oil, hydrocarbons, and organic compounds from the surface of water, and to adhere to the surface of the polypropylene bristles. It is believed that such a function can be particularly useful to reduce the amount of hydrocarbons and other organic compounds in drainage water run-off.

The bristles 31, held in place at their upper ends by the beam 32, are arranged in a configuration as appropriate for the intended use; typically, the upper ends of the bristles are positioned adjacent to each other. The upper ends of the bristles are connected together at the beam by any suitable means, such as glue and/or pressure provided by the beam (e.g., crimping by the beam), or molding. If the upper ends of the bristles are positioned adjacent to each other, and the bristle density is determined by how closely the bristles can be practically positioned together. The bristles are typically oriented approximately perpendicular to the beam; however, in alternative embodiments the bristles may have a non-perpendicular orientation in any direction.

Typically, as shown in FIGS. 4 and 5 and discussed later in more detail with reference to FIGS. 7 and 8, the frame structure 17 positions the beam of the broom filter, using any suitable mechanism, so that the bristles form greater than a 90° vertical angle with respect to the flow direction of said drainage water, so that the weight and flexibility of the bristles allows the distal ends to conform to variations and small obstacles in the road surface. Furthermore, in operation, flowing drainage water advantageously forces the bristles against the road surface, thereby providing additional resistance to forces resulting from the flowing drainage water.

Figure 6:
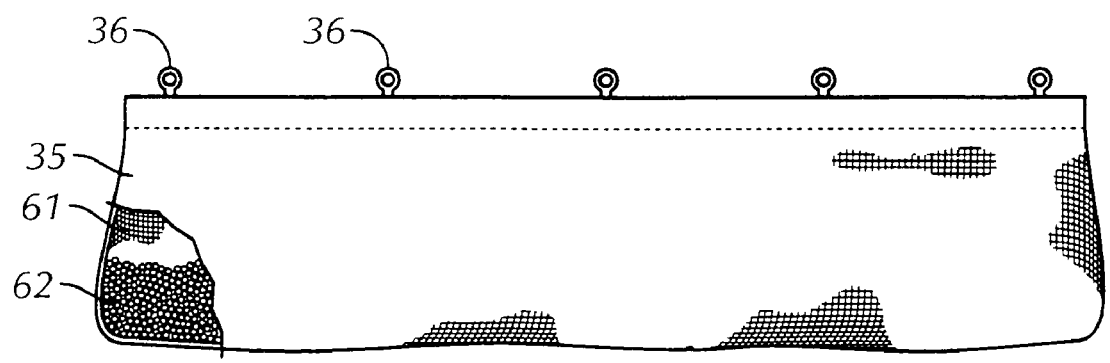
FIG. 6 is a view of a filtration bag with a portion cutaway to reveal the contaminant-absorbing filter media therein.

Reference is now made to FIG. 6 together with FIG. 3. FIG. 6 is a perspective view of a filtration bag 35 viewed from the side, including the plurality of loops 36 that engage with hooks 34 on the broom filter (as shown in FIG. 3). The filtration bag 35 comprises any suitable mesh-like material 61, and is closed at its upper end to hold contaminant-absorbing filter media 62 therein. The filter media 62, in granular form, is shown in the cutaway view through the bag. In one embodiment the filtration bag utilizes oil-absorbing filter media such as disclosed in U.S. Pat. No. 5,304,311 to Stelio Codiglia, entitled "Method for Removing Hydrocarbon Products from the Surface of an Aqueous Medium". The Codiglia patent discloses an elastomeric material that absorbs hydrocarbons and forms a jelly-like mass that is homogeneous, and floats on a water surface. Such an elastomeric material is commercially available as the Rubberizer® filter media available from Haz-Mat Response Technologies, Inc., 4626 Santa Fe St., San Diego, Calif. 92109. Further information is available on the website: www.rubberizer.com. According to this manufacturer, the Rubberizer® filter media can absorb and transform into a rubber-like material many petroleum products including gasoline, jet fuel, diesel fuels, transformer oils, hydraulic oils, lube oils, aromatic solvents, chlorinated solvents, light crudes, and many other compounds. Advantages cited by the manufacture include buoyancy in water, solidification and landfill-approval, and resistance to leaching; furthermore the filter media does not release solidified oils under pressure, and incinerates with less than 0.1% residual ash.

The filter media material is available in different forms; for example cylindrical booms, pillows, or in granular form. The granular form is preferred for the present implementation in which the granular filter media is held in mesh filtration bags that are arranged to float downstream of the broom filter.

Figure 7A:
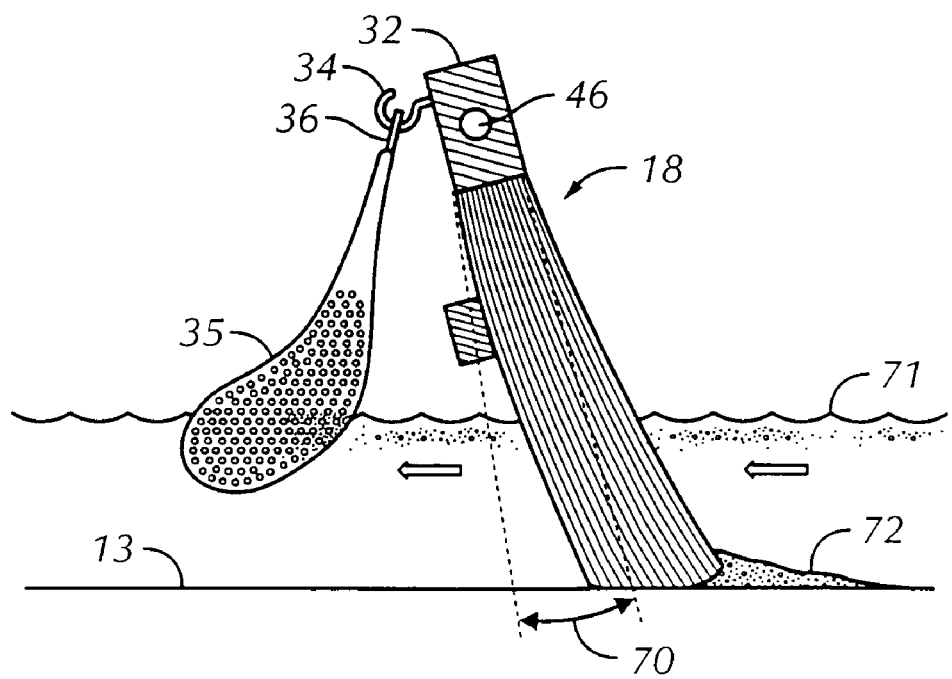
FIG. 7A is a cross-sectional view of a filter assembly that includes a broom filter and a filtration bag in flowing drainage water.

Reference is now made to FIG. 7A, which is a side view that shows a broom filter and an attached filtration bag held in a position to filter drainage water 71. Particularly, the frame structure 17 (FIGS. 1 and 2) holds the broom filter into a position so that the bristles extend downwardly from the rigid beam toward the road, and the distal ends of the bristles substantially contact the road surface. As discussed above with reference to FIG. 4, the broom filters have extensions 46 that define an axis of rotation, and the frame structure has an appropriate receptacle, such as a U-shaped bracket that receives the extensions 41 and 42 and allows slideable rotation. In such an embodiment, the broom filter can rotate to allow the bristles to contact the road surface, allowing it to conform to variations in the road surface. Particularly, as illustrated in FIG. 7A, pivotal motion allows the bristles to be rotated forward by an angle shown at 70, to brace against the water flow, and thereby to self-stabilize the broom filter against the road.

Figure 7B:
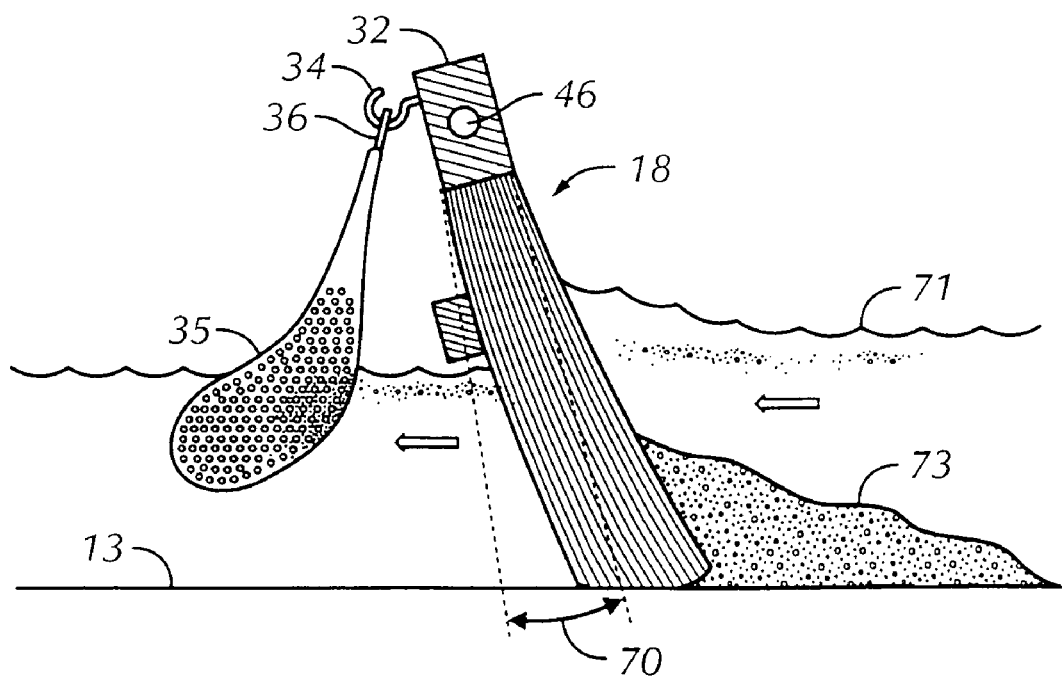
FIG. 7B is a cross-sectional view of the filter assembly as in FIG. 7A, except that a significant amount of sediment has built up in front of the broom filter.

When flowing water encounters the broom filter as shown in FIGS. 7A and 7B, sediment (e.g., dirt, silt and rocks) is stopped in front of the filter and is deposited in a sediment deposit 72 at the leading edge of the broom filter. (Water flows from right to left, as indicated by the arrows.)

It may be noted that over time, as the sediment deposit builds up, the water level through the broom filter rises, and therefore the water flow would not be significantly constricted as the sediment builds up (at least until the water level reaches the beam 32). FIG. 7B is a side view as in FIG. 7A, except that FIG. 7B shows a second sediment deposit 73 that is much deeper than the first sediment deposit 72 shown in FIG. 7A. Still, the water flow is unconstricted as shown in FIG. 7B. Thus, the broom filter advantageously allows water to flow through substantially unrestricted even if a significant amount of sediment has been deposited in front.

In FIGS. 7A and 7B, the filtration bag 35 is hung on hooks 34 provided on the broom filter's beam 32, so that the filtration bag is free to adjust, under the force of flowing drainage water, out and away from the broom filter. In the embodiment in which the filtration bag includes oil-absorbing media, the filtration bag 35 floats on top of the water, and therefore the bag is free to adjust itself as appropriate to stay on top of the water, and absorb hydrocarbons that may pass through.

Alternative Embodiment with Multiple Broom Filters

Figure 8:
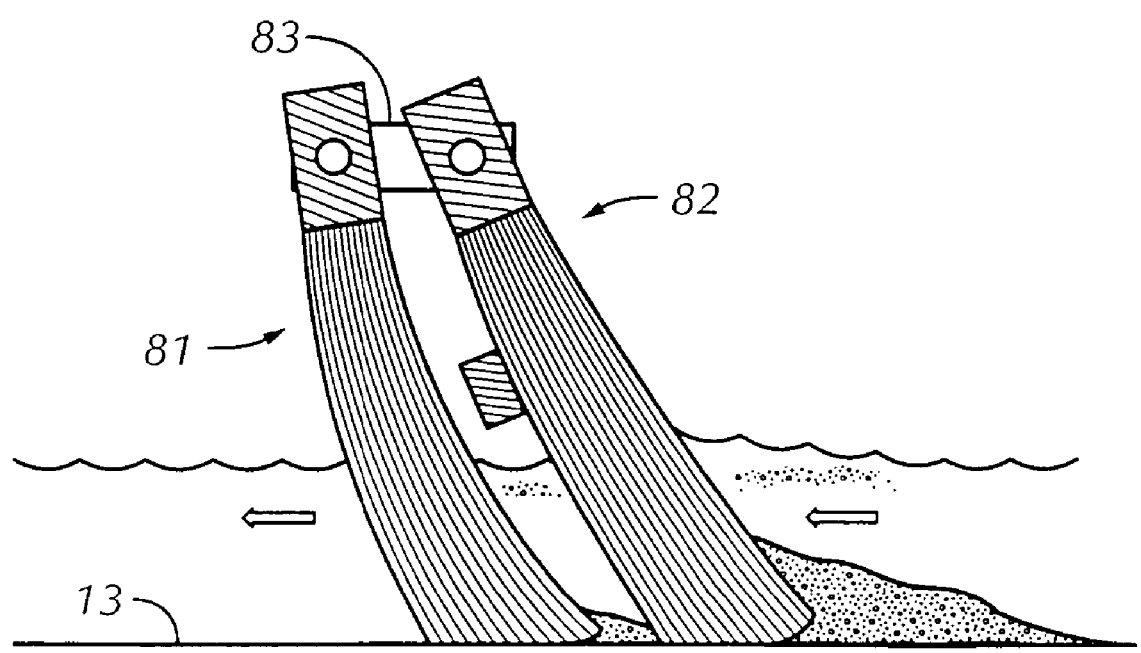
FIG. 8 is a cross-sectional view of a filter assembly that includes a first and a second broom filter, positioned in flowing drainage water.

Reference is now made to FIG. 8. In some embodiments, two or more broom filters may be arranged in series. In one such embodiment as shown in FIG. 8, a first broom filter 81 stops the larger particles, and one or more additional broom filters, such as a second broom filter 82 downstream of the first broom filter stops progressively smaller particles. A third broom filter (not shown) may be provided to stop even smaller particles. For example, the first broom filter may have stronger, wider bristles positioned farther apart to stop larger particles and rocks, and the second broom filter may have finer bristles designed to stop smaller particles. The first and second broom filters are similar in construction to the broom filters 30 described herein with reference to FIGS. 3–5. In the embodiment shown in FIG. 8, the first and second broom filters are connected to a holding bracket that is connected to the frame. Each filter can rotate about an axis, which advantageously allows the bristles to conform to the level of the road. The broom filters are positioned non-perpendicular to the road, and they may be positioned at opposite angles to the perpendicular as illustrated, or they may be rotated to be approximately parallel and opposing the water flow as shown in FIG. 7A.

Street Filter Structure

Figure 9:
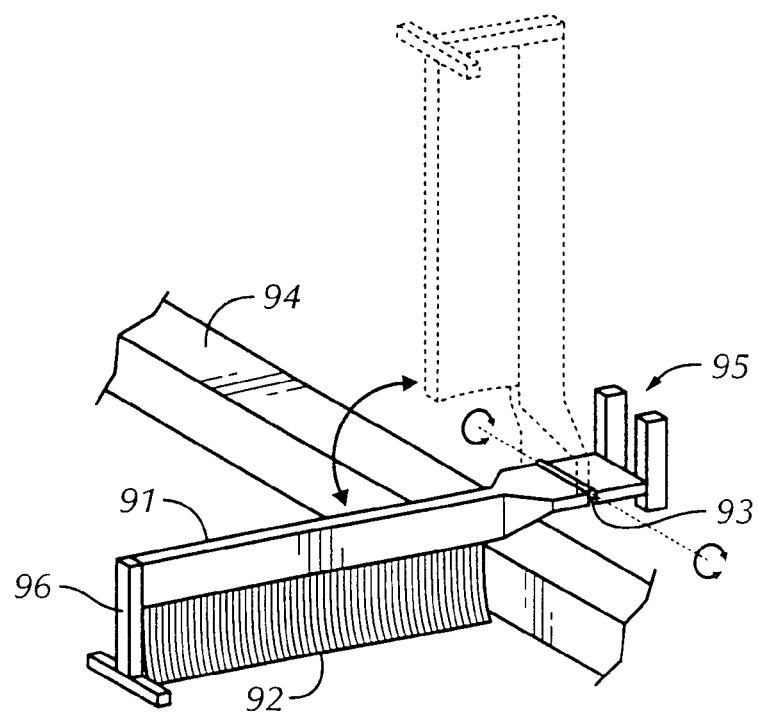
FIG. 9 is a perspective view of an embodiment of a street filter in which the arm has a hinge that allows upward rotation of the arm, which allows sufficient motion to advantageously allow street sweeping, and the arm can then easily be repositioned when street cleaning is complete.
Figure 10:
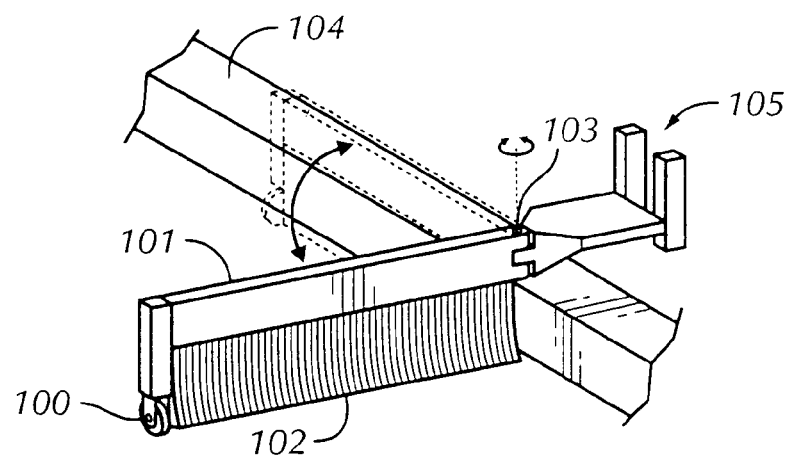
FIG. 10 shows an embodiment of a street filter in which the arm has a hinge and a support wheel that allows horizontal rotation along the road to allow street cleaning, and then allows repositioning when street cleaning is complete.

Reference is made to FIGS. 9 and 10, which are two different embodiments of a street filter structure that includes a filter assembly on an elongated arm extending from a curb into a road to filter and slow drainage water flowing down the road.

FIG. 9 is a perspective view of one embodiment of a street filter, including an arm 91 on which a filter assembly 92 is disposed. The filter assembly 92 may have a construction like that shown in FIG. 3. The arm 91 has a horizontally-aligned hinge 93 that allows vertical movement of the arm 92, which provides sufficient motion to allow removal of the arm from the road, and advantageously allow street sweeping. The hinge 93 is anchored into the ground near a curb 94 by any suitable structure 95, which may include one or more stakes. On its opposite end (the end farthest out in the road), a foot 96 extends from the arm to the road, and includes a base 97 that provides greater stability to the arm and filter assembly, to hold it steady against the flow of water.

In order to move the arm 91 for cleaning or for any other purpose, the arm may be lifted by hand, or if it is too long or heavy to be practically operated by hand, a rope and pulley assembly (not shown) may be included. For example, the arm 91 may be lifted for street sweeping, and when street cleaning is complete, the arm can be let back down to easily reposition the broom filter on the road.

FIG. 10 is a perspective view of another embodiment of a street filter. In FIG. 10, an arm 101 has a support wheel 100 disposed on its end that can roll along the road. The arm 101 has a filter assembly 102 connected thereto, and the filter assembly may have a construction like that shown in FIG. 3, including at least a broom filter. The arm 101 has a vertically-aligned hinge 103 that allows horizontal movement of the arm 102 supported by the wheel 100, which provides sufficient motion to horizontally rotate the arm out of the road, and advantageously allow street sweeping. The hinge 103 is anchored into the ground near a curb 104 by any suitable structure 105, which may include one or more stakes. The arm 101 may be rotated by hand, or if it is too long or heavy to be practically operated by hand, a rope and pulley assembly (not shown) may be included. Thus, the arm 101 may be moved to allow street sweeping, and when street cleaning is complete, the arm can be rotated back to easily reposition the broom filter on the road.

Figure 11:
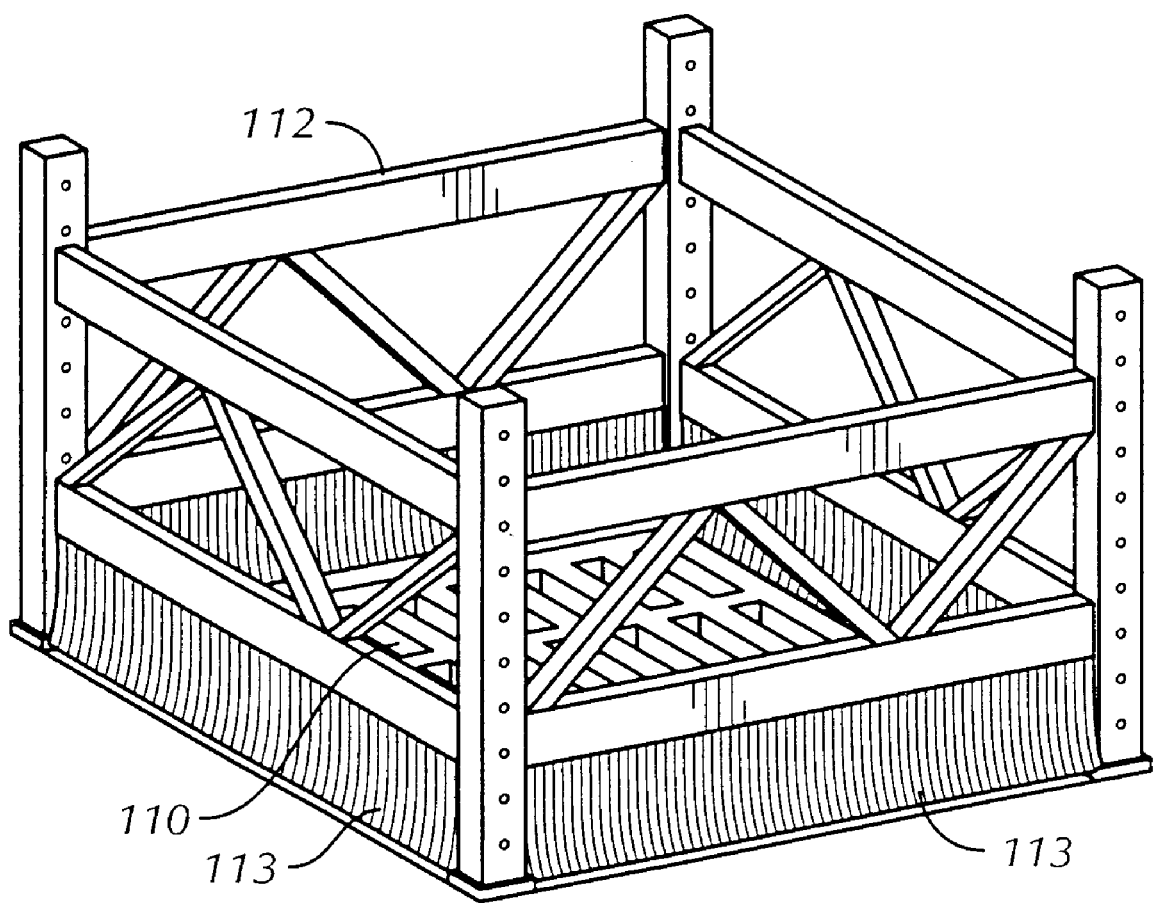
FIG. 11 is a perspective view of a stand-alone (washout) storm drain and an erosion control filter positioned on the storm drain.

FIG. 11 is an example of an embodiment of a frame structure 110 that is designed to surround a curbside storm drain 112. Particularly, the frame structure 110 forms a closed structure that completely surrounds the storm drain. At its lower end the frame structure 110 attaches to a plurality of filter assemblies 113 that include at least a broom filter. For example, the filter assemblies 113 may be similar to the filter assembly shown in FIG. 3, including a broom filter and a filtration bag.

FIGS. 12A and 12B show one embodiment of a broom filter and rail, specifically illustrating assembly of a broom filter 120 and a support rail 121 to allow rotation of the bristles 122 to conform to road surface elevation and irregularities. Another advantage is that these particular components are available off-the-shelf, for example from Seasafe, Inc. of Lafayette, La. (www.seasafe.com).

FIG. 12A is a perspective view of one embodiment of a broom filter and a rail that holds the broom filter. In FIG. 12A, the broom filter 120 has a beam 123 that includes a first flange 124 and a second flange 125 that projects laterally from the beam. The flanges extend along the length of the beam, and have a configuration to loosely fit with openings in the support rail 121. Specifically the rail has a first opening 126 and a second opening 127 that has a configuration to loosely accept the first and second flanges.

FIG. 12B is a cross-sectional view of the broom filter and rail as in FIG. 12A, illustrating positioning of the beam within the rail, and also illustrating clearances within the rail that provide movement of the bristles to allow better positioning on the road surface. In FIG. 12B, the beam 123 is shown inserted into the opening in the rail 121. As shown, the flanges in the beam loosely fit into the appropriate openings in the rail, and sufficient movement is permitted to allow some rotation of the ends of the bristles, to allow the bristles to rotate over an angle 128, while still holding the beam tightly enough to prevent it from falling out of the rail.

The beam 123 may also comprise a plurality of hooks along its length, which operate to hold a filtration bag such as the filtration bag shown at 35 in FIG. 3. One such hook is shown at 129 in FIG. 13.

Embodiments with Additional Filters

The filtering system may also include one or more secondary filters, in addition to the primary broom filter, that further filter the water after it passes through the broom filter(s). For example a screen or other filter may be situated on an additional beam within the frame to filter out smaller contaminants such as silt that goes through the primary filter(s), and/or an oil filtration bag as discussed in more detail herein, which can remove oil and/or other hydrocarbon compounds from the water as it flows by. In other words, one or more additional filters can be attached to the inside of the frame, downstream from the filter assemblies to provide further filtering. There are many types of filters available, and the frame provides opportunities to attach these filters in a way to re-filter the water that has already been initially filtered by the primary outer filter assemblies.

Figure 13:
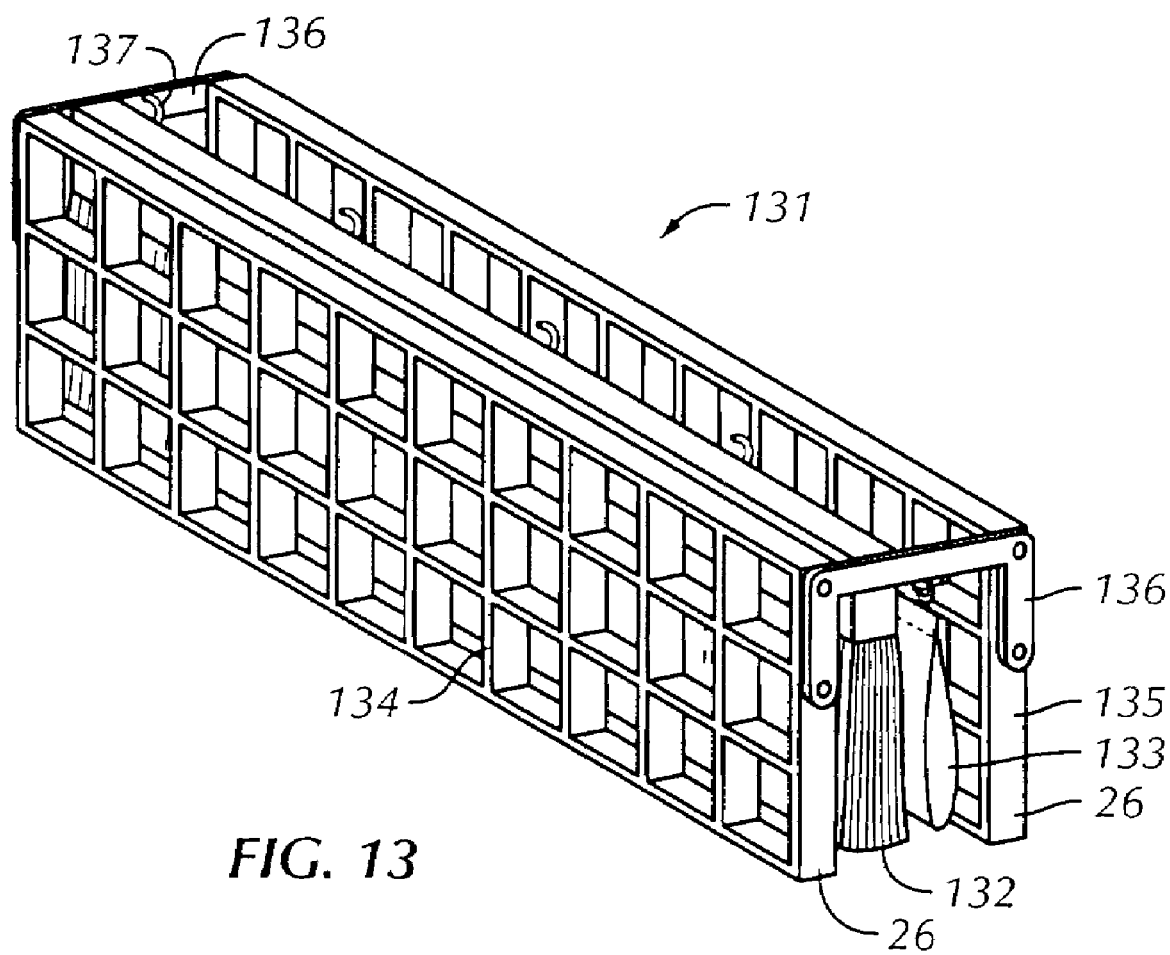
FIG. 13 is a perspective view of a secondary filter assembly for a curbside erosion control filter.

FIG. 13 is a perspective view of an alternative filter assembly for a curbside erosion control filter, which is utilized as a secondary filter assembly 131 on the curbside filter shown in FIGS. 1 and 2. Particularly, the secondary filter assembly 131 is connected to the two posts on the curbside, using any suitable fasteners. Since this filter assembly 131 is positioned downstream of the other (primary) filters, the secondary filter assembly operates as a second line of defense, to re-filter previously filtered water, and furthermore the secondary filter assembly acts as a backup in the event of failure of one of the primary filters.

The secondary filter assembly 131 includes a housing that holds a broom filter 132 as shown at 30 in FIGS. 3–5, and a filtration bag 133 such as the filtration bag 35, also shown in FIGS. 3–5. The housing includes a first rigid structure 134 and a second rigid structure that has a number of openings to allow water to flow through. A bracket 136 holds the first and second structures together, and also provides a connection point for the broom filter and filtration bag. In this embodiment, the broom filter includes a plurality of hooks 137 to hold the filtration bag; however other embodiments may utilize different fastening methods. Because the first and second rigid structures support the broom filter and bag against the flow of water, it is not required that the broom filter have a non-zero angle with the road; i.e., the broom filter 132 may be approximately perpendicular to the road.

It will be appreciated by those skilled in the art, in view of these teachings, that alternative embodiments may be implemented without deviating from the spirit or scope of the invention.

For example, frames discussed herein for holding the filter assembly include a frame designed to protect a curbside storm drain, and a frame designed to protect a standalone storm drain; however other suitable frames may be utilized.

This invention is to be limited only by the following claims, which include all such embodiments and modifications when viewed in conjunction with the above specification and accompanying drawings.

What is claimed is:

1. An erosion control apparatus for filtering drainage water flowing along a surface comprising:
    a broom filter including a plurality of adjacent bristles attached at their proximate ends along the length of a beam; and
    a frame that holds the broom filter so that the bristles extend downwardly from the beam toward the surface, and the distal ends of the bristles substantially contact the surface;
    wherein said frame has a configuration that surrounds a storm drain inlet, and further comprising a plurality of broom filters positioned around the periphery of said frame.

2. The apparatus of claim 1 wherein said beam of said broom filter is pivotally connected to said frame, so that said broom fitter pivots about a long axis defined by said beam, thereby allowing said bristles to rotate to contact the surface, and thereby allowing the weight and flexibility of said bristles resting upon the surface to conform to any surface variations that may be present, and providing resistance to forces resulting from said flowing water.

3. The apparatus of claim 1 further comprising at least one secondary broom filter positioned downstream of the first broom filter.

4. An erosion control apparatus for filtering drainage water flowing alone a surface comprising:
    a broom filter including a plurality of adjacent bristles attached at their proximate ends along the length of a beam; and
    a frame that holds the broom filter so that the bristles extend downwardly from the beam toward the surface, and the distal ends of the bristles substantially contact the surface;
    wherein said broom filter is attached to an arm that extends from a curb of the road in an extended position.

5. The apparatus of claim 4 wherein said bristles are comprised of polypropylene.

6. The apparatus of claim 4 wherein said bristles form at least a 90° vertical angle with respect to the flow direction of said drainage water.

7. The apparatus of claim 6 wherein said bristles have substantially greater than a 90° vertical angle with respect to the flow direction of said drainage water, thereby allowing the weight and flexibility of the bristles to conform to variations in the road surface, and so that said flowing water forces said bristles against the road surface, thereby providing resistance to forces resulting from said flowing water.

8. The apparatus of claim 4 further comprising a filtration bag to filter hydrocarbons from the drainage water, said bag positioned downstream of said broom filter.

9. The apparatus of claim 8 wherein said oil filtration bag comprises a plurality of loops, and said beam comprises a plurality of hooks arranged to receive and hold said plurality of loops.

10. The apparatus of claim 4 wherein said arm is pivotally attached to the ground proximate to the curb, thereby allowing said arm to be temporarily removed from an extended position along the road surface.

11. A curbside erosion control apparatus for filtering drainage water flowing from a road surface into a storm drain inlet at a construction site comprising:
    a frame having a configuration to surround an area around the storm drain inlet, said frame including at least a first side section and a second side section;
    a plurality of broom filters, each including a plurality of adjacent bristles attached at their proximate ends along the length of a substantially rigid beam; and
    said frame holding a first of said plurality of broom filters on the first side section, and a second broom filter on the second side section, each of said broom filters situated so that the bristles extend downwardly from the rigid beam toward the road, and the distal ends of the bristles substantially contact the road surface, so that said bristles form at least a 90° vertical angle with respect to the flow direction of said drainage water.

12. The apparatus of claim 11 wherein said bristles have substantially greater than a 90° vertical angle with respect to the flow direction of said drainage water, thereby allowing the weight and flexibility of the bristles to conform to variations in the road surface, and so that said flowing water forces said bristles against the road surface, thereby providing resistance to forces resulting from said flowing water.

13. The apparatus of claim 12 wherein said rigid beam of said broom filter is pivotally connected to said frame, so that said broom filter pivots about a long axis defined by said rigid beam, thereby allowing said bristles to rotate to contact the road surface, and thereby allowing the weight and flexibility of said bristles resting upon the road surface to conform to variations in the road surface, and providing resistance to forces resulting from said flowing water.

14. The apparatus of claim 13 wherein said rigid beam includes a disk-shaped extension on each end that defines said long axis, and the frame has a bracket that receives said extensions, to allow rotation about said long axis.

15. The apparatus of claim 12 wherein said frame includes a support beam arranged behind said bristles to support said bristles against the force of the flowing water.

16. The apparatus of claim 11 further comprising a filtration bag to filter hydrocarbons from the drainage water, said bag positioned downstream of said broom filter.

17. The apparatus of claim 11 further comprising at least one secondary broom filter positioned downstream of the first broom filter.

18. The apparatus of claim 11 wherein said broom filter comprises a first and a second flange extending laterally from said beam, and said frame comprises a rail having a configuration including a first opening that receives said first flange, and a second opening that receives said second flange.

19. The apparatus of claim 11 wherein said bristles are comprised of polypropylene.

20. The apparatus of claim 11 wherein said first and said second side sections of said frame each comprises an inside post, an outside post, a side beam and a side rail, said inside post and said outside post are connected to each other by said side beam and said side rail, and said rail is connected to said broom filter.

21. The apparatus of claim 11 wherein said frame comprises a first and a second cross-beam, a cross-rail, and a secondary filter housing, and wherein said first and second side sections are connected by said first and second cross-beams, said cross-rail, and said secondary filter housing.

22. An erosion control apparatus for filtering drainage water flowing along a road surface at a construction site comprising:
 a broom filter including a plurality of adjacent bristles attached at their proximate ends along the length of a substantially rigid beam; and
 an arm that extends from a curb of the road in an extended position, said frame holding the broom filter so that the bristles extend downwardly from the rigid beam toward the road, and the distal ends of the bristles substantially contact the road surface, so that said bristles define substantially greater than a 90° vertical angle with respect to the flow direction of said drainage water, thereby allowing the weight and flexibility of the bristles to conform to variations in the road surface, and so that said flowing water forces said bristles against the road surface, thereby providing resistance to forces resulting from said flowing water.

23. The apparatus of claim 22 further comprising a filtration bag to filter hydrocarbons from the drainage water, said bag positioned downstream of said broom filter.

24. The apparatus of claim 22 wherein said bristles are comprised of polypropylene.

25. The apparatus of claim 22 wherein in said extended position said arm positions the long axis of said broom filter approximately perpendicular to flow of the drainage water.

26. The apparatus of claim 22 wherein said arm is pivotally attached to the ground proximate to the curb, thereby allowing said arm to be temporarily removed from an extended position along the road surface.

27. The apparatus of claim 26 wherein said pivotal attachment includes a hinge at the proximate end of said arm.

28. The apparatus of claim 26 wherein said hinge pivots approximately vertically, thereby allowing upward removal of said arm from the road.

29. The apparatus of claim 28 wherein said hinge pivots approximately horizontally, and further comprising a support wheel positioned near the distal end of said arm, so that said wheel and said hinge operate cooperatively to allow horizontal movement of said arm approximately parallel with the road, thereby allowing removal of said arm from said road.

* * * * *